US012578819B2

(12) United States Patent
Park et al.

(10) Patent No.: US 12,578,819 B2
(45) Date of Patent: Mar. 17, 2026

(54) TOUCH PANEL WITH ISO-RESISTANCE COMPENSATION PATTERN

(71) Applicant: G2TOUCH Co., LTD., Seongnam-si (KR)

(72) Inventors: Joo Bin Park, Seongnam-si (KR); Ji Woon Won, Seongnam-si (KR)

(73) Assignee: G2TOUCH Co., LTD., Seongnam-si (KR)

( * ) Notice: Subject to any disclaimer, the term of this patent is extended or adjusted under 35 U.S.C. 154(b) by 0 days.

(21) Appl. No.: 18/960,882

(22) Filed: Nov. 26, 2024

(65) Prior Publication Data

US 2025/0231640 A1      Jul. 17, 2025

(30) Foreign Application Priority Data

Jan. 17, 2024      (KR) ........................ 10-2024-0007261

(51) Int. Cl.
G06F 3/041          (2006.01)
G06F 3/044          (2006.01)

(52) U.S. Cl.
CPC ............ G06F 3/0418 (2013.01); G06F 3/044 (2013.01)

(58) Field of Classification Search
CPC .... G06F 3/0418; G06F 3/044; G06F 3/04164; G06F 3/0412; G06F 3/0445; G06F 3/0446; G06F 3/047
See application file for complete search history.

(56) References Cited

U.S. PATENT DOCUMENTS

| | | | | |
|---|---|---|---|---|
| 11,861,118 | B2 * | 1/2024 | Fang ...................... | G06F 3/0412 |
| 2017/0097703 | A1 * | 4/2017 | Lee ........................ | G06F 3/0443 |
| 2019/0179461 | A1 | 6/2019 | Baek | |
| 2023/0072599 | A1 * | 3/2023 | Nakanishi ............. | G06F 3/0443 |

FOREIGN PATENT DOCUMENTS

| | | | | |
|---|---|---|---|---|
| KR | 10-2019-0045704 A | | 5/2019 | |
| KR | 20190045704 | * | 5/2019 ........... | G06F 3/0418 |
| KR | 10-2020-0072956 A | | 6/2020 | |

* cited by examiner

*Primary Examiner* — Hong Zhou

(57) ABSTRACT

The present invention relates to a touch panel having a resistive compensation pattern. According to an embodiment of the invention, the touch panel includes: a plurality of touch electrodes arranged in a matrix of multiple rows and multiple columns; a plurality of sensor signal lines each connected to a corresponding one of the touch electrodes; and a touch drive integrated circuit (IC) configured to analyze a touch signal of the touch electrode transmitted through the sensor signal line to determine whether the touch electrode is touched, wherein a dummy signal line is constituted in at least one of the sensor signal lines to match resistance of the sensor signal lines belonging to the same row within an allowable tolerance. The present invention also includes embodiments different from the above embodiment.

7 Claims, 6 Drawing Sheets

TOUCH PANEL WITH ISO-RESISTANCE COMPENSATION PATTERN

CROSS-REFERENCE TO RELATED APPLICATION

The present application claims priority to and the benefit of Korean Patent Application No. 10-2024-0007261, filed on Jan. 17, 2024, in the Korean Intellectual Property Office, the entire disclosure of which is incorporated herein by reference.

TECHNICAL FIELD

The present invention relates to a touch panel having an iso-resistance compensation pattern in a region of a touch signal line connected to a touch electrode.

BACKGROUND ART

In general, touchscreens may be applied not only to mobile devices, such as smartphones, personal digital assistants (PDAs), portable multimedia players (PMPs), and the like, but also to many different types of electronic devices, such as navigation systems, netbooks, laptops, digital information devices (DIDs), Internet Protocol televisions (IP-TVs), and the like.

Touchscreens may be categorized into on-cell touchscreens, which are disposed on various types of displays, such as liquid crystal displays (LCDs), plasma display panels (PDPs), organic light emitting diode (OLED) displays, and the like, and in-cell touchscreens, which are integrated into such displays.

Displays with touchscreens can be categorized into various types, such as touchscreen add-on type displays, touchscreen on-cell type displays, touchscreen in-cell type displays, and the like.

Touchscreens may adopt various touch detection methods, for example, a resistive film method, a capacitive method, an electromagnetic induction method, an infrared method, an ultrasonic method, and the like.

Capacitive touchscreens can detect the presence and location of a touch based on a voltage change caused by touch capacitance (Ct) generated in a touch electrode (touch sensor), as a touch input tool, such as a finger or an electronic pen, touches or approaches the touch electrode arranged on the touchscreen.

Capacitive touchscreens can be categorized into mutual capacitance touchscreens and self-capacitance touchscreens. In mutual capacitance touchscreens, transmission (Tx) touch electrodes and reception (Rx) touch electrodes placed in different layers work in pairs to generate touch capacitance.

In self-capacitance touchscreens, a single touch electrode generates its own touch capacitance. The self-capacitance touchscreen may be referred to, for example, as a self-capacitive touchscreen.

FIG. 1a is a diagram illustrating a conventional touch panel.

Referring to FIG. 1a, a touch panel 100 may be divided into an active area (AA) as an effective area where touch can occur, and an inactive area (IAA) corresponding to the remaining area of the touch panel 100, in which the inactive area (IAA) may include a fan-out (FO) area.

A touch drive IC (TDI) 140 may be mounted on a flexible film 150.

As shown in FIG. 1a, the touch panel 100 may be provided with a plurality of touch electrodes 110, a plurality of sensor signal lines 120, and a plurality of connection terminals 130.

The touch electrodes 110 may be arranged in a matrix of multiple rows (for example, R1 to R6) and multiple columns (for example, C1 to C6), and the sensor signal lines 120 may be each independently connected to a corresponding one of the touch electrodes 110 and may be independently connected to the connection terminals 130 through the fan-out (FO) area.

FIG. 1b is a diagram of one example of the conventional sensor signal line.

Referring to FIG. 1b, a plurality of sensor signal lines 120 belonging to the same row may be arranged at different lengths. For example, as shown in FIG. 1b, first to sixth sensor signal lines 120-1 to 120-6 belonging to a first row R1 may have the same width and may be arranged at different lengths.

Since the first to sixth sensor signal lines 120-1 to 120-6 belonging to the first row R1 have the same width and different lengths, the sensor signal lines may have different intrinsic resistance values (RV1_R1C1, RV2_R1C2, RV3_R1C3, RV4_R1C4, RV5_R1C5, RV6_R1C6).

In addition, since the fifth sensor signal line 120-5 corresponding to the first row R1 and a fifth column C5 has the shortest length, the fifth sensor signal line may have the lowest intrinsic resistance RV5_R1C5, and since the first sensor signal line 120-1 corresponding to the first row R1 and a first column C1 has the longest length, the first sensor signal line may have the highest intrinsic resistance RV1_R1C5.

As described above, when there is a resistance difference between the sensor signal lines belonging to the same row (for example, R1), conductivity of each of the sensor signal lines transmitting touch signals generated by the touch electrodes in the same row (for example, R1) varies, thereby causing deterioration in accuracy of low-scan type touch detection.

FIG. 1c is a diagram of another example of the conventional sensor signal line.

FIG. 1c shows an example of varying not only lengths of sensor signal lines belonging to a single column but also widths thereof to reduce resistance deviation of the sensor signal lines.

Specifically, the width of a sensor signal line 10a distant from the fan-out (FO) area is set to be greater than the width of a sensor signal line 10d close to the fan-out (FO) area in FIG. 1 to reduce the resistance deviation of the sensor signal lines.

However, the example of the sensor signal lines shown in FIG. 1c has a problem of designing different widths of the sensor signal lines depending on the location of the touch drive IC (TDI) 140.

DISCLOSURE

Technical Problem

The present invention has been conceived to address the aforementioned problems of the conventional touch panels and relates to a touch panel having an iso-resistance compensation pattern capable of reducing resistance deviation of sensor signal lines while minimizing design change of the sensor signal lines despite change in location of a touch drive IC (TDI).

The present invention can provide a touch panel capable of efficiently compensating for resistance deviation of sensor signal lines belonging to the same row through dummy resistive lines in some zones of the sensor signal lines.

Technical Solution

In accordance with one embodiment of the present invention, a touch panel having an iso-resistance compensation pattern includes:

a plurality of touch electrodes arranged in a matrix of multiple rows and multiple columns;

a plurality of sensor signal lines each connected to a corresponding one of the touch electrodes; and a touch drive integrated circuit (IC) configured to analyze a touch signal of the touch electrode transmitted through the sensor signal line to determine whether the touch electrode is touched, wherein a dummy signal line is constituted in at least one of the sensor signal lines to match resistance of the sensor signal lines belonging to the same row within an allowable tolerance.

Preferably, the dummy signal line is formed by disconnecting a portion of the sensor signal line so as not to transmit the touch signal.

Preferably, a width of the dummy signal line increases with increasing width of the sensor signal line, the width and length of the dummy signal line is determined in consideration of the width and length of the sensor signal line in a fan out region, and the fan-out area is a region in which each of the sensor signal lines disposed in an inactive area of the touch panel is connected to the touch drive IC in the shortest length, and the sensor signal lines belonging to the same row in the fan-out area are multiplexed through a multiplexer so as to be connected to the same connection terminal of the touch drive IC.

Preferably, at least one of the sensor signal lines belonging to the same row is free from a dummy signal line.

Preferably, the sensor signal line has a different shape from the dummy signal line.

Preferably, the widths and lengths of the dummy signal lines belonging to the same row vary depending on a location of the touch drive IC, and the widths of the sensor signal lines belonging to the same row do not vary depending on the location of the touch drive IC.

Preferably, the dummy signal line includes at least one sub-dummy signal line individually separated.

Preferably, the sensor signal lines and the dummy signal line are composed of a transparent conductive material.

Effects of the Invention

A touch panel having an iso-resistance compensation pattern according to embodiments of the present invention has an effect of maintaining resistance deviation of sensor signal lines belonging to the same row to a minimum value.

The touch panel having the iso-resistance compensation pattern according to the embodiments of the present invention is not required to change design of the sensor signal lines despite change in location of a touch drive IC.

DESCRIPTION OF DRAWINGS

FIG. 1a is a diagram of a conventional touch panel.

FIG. 1b is a diagram of one example of the conventional sensor signal line.

DETAILED DESCRIPTION

Hereinafter, preferred embodiments of the present invention will be described in detail with reference to the accompanying drawings.

A touch panel according to embodiments of the present invention may be applied not only to mobile devices, such as smartphones, PDAs, PMPs, and the like, but also to many different types of electronic devices, such as navigation systems, netbooks, notebooks, DIDs, IPTVs, and the like.

The touch panel according to the embodiments of the present invention may be attached to various types of displays, such as LCDs, PDPs, and OLEDs, or may be integrated with such displays.

Figure 2:
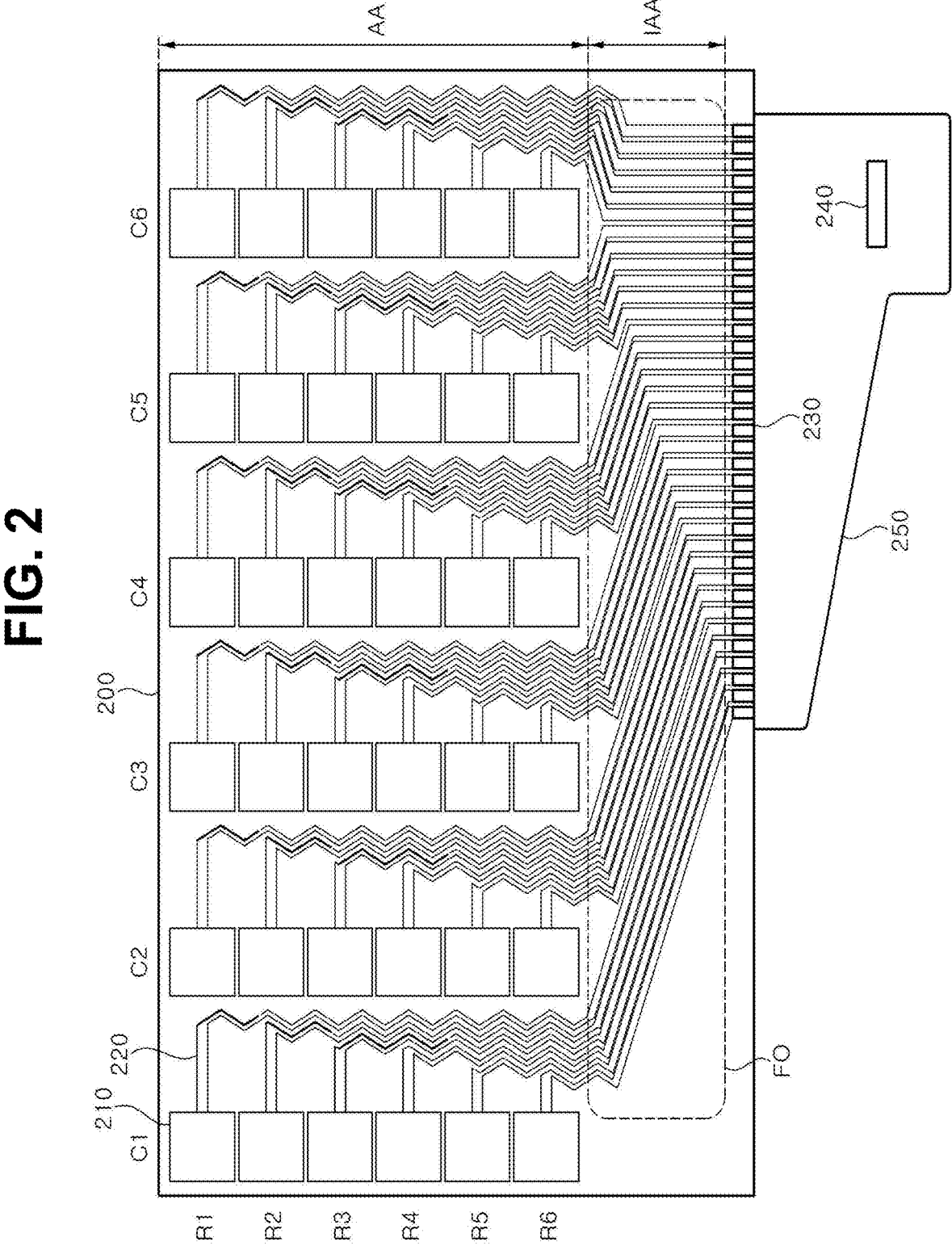
FIG. 2 is a diagram of a touch panel including sensor signal lines with an iso-resistance compensation pattern according to one embodiment of the present invention.

FIG. 2 is a diagram of a touch panel including sensor signal lines with an iso-resistance compensation pattern according to one embodiment of the present invention.

A touch panel 200 having an iso-resistance compensation pattern according to an embodiment of the present invention includes a plurality of touch electrodes 210 arranged in a matrix of multiple rows and multiple columns, a plurality of sensor signal lines 220 each connected to a corresponding one of the touch electrodes 210, and a touch drive IC (integrated circuit) 240 configured to analyze a touch signal of the touch electrode 210 transmitted through the sensor signal line 220 to determine whether the touch electrode 210 is touched.

In one embodiment, a dummy signal line (for example, 306, 307, and 308 in FIG. 3a) is constituted in at least one of the sensor signal lines 220 to match resistance of the sensor signal lines 220 belonging to the same row within an allowable tolerance.

The dummy signal line according to the present invention is formed by disconnecting a portion of the sensor signal line 220 so as not to transmit a touch signal from the touch electrode 210.

In one embodiment, the touch electrodes 210, the sensor signal lines 220, and the dummy signal lines (for example, 306, 307, and 308 in FIG. 3a) may be formed of the same material.

In one embodiment, the touch electrodes 210, the sensor signal lines 220, and the dummy signal lines (for example, 306, 307, and 308 in FIG. 3a) may be fabricated from the same mask.

Figure 3A:
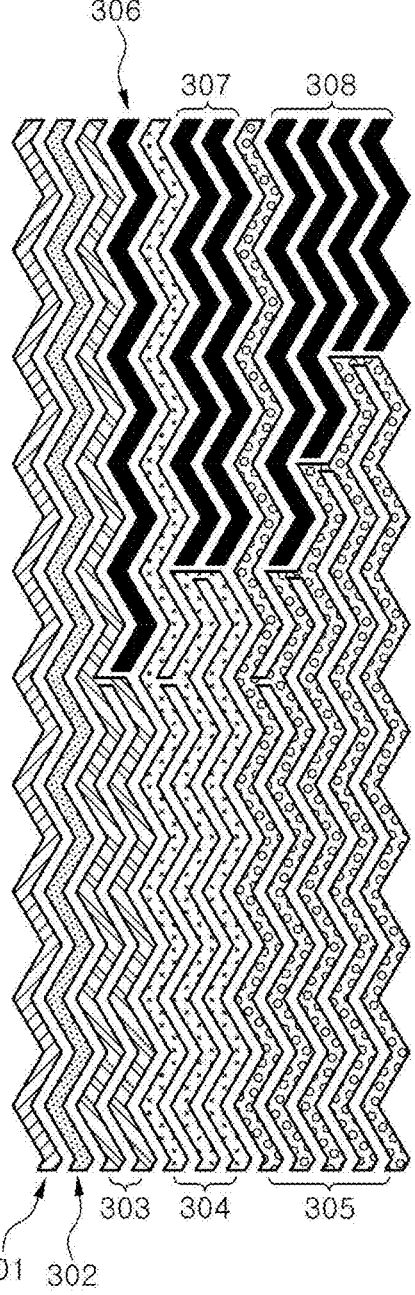
FIGS. 3a and 3b are views of examples of sensor signal lines with an iso-resistance compensation pattern according to the present invention.
Figure 3B:
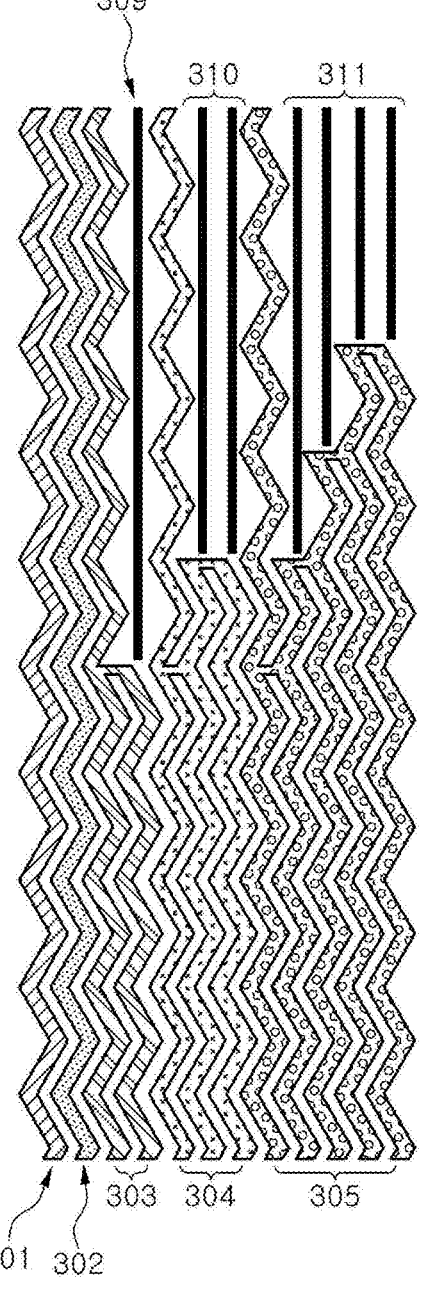

FIGS. 3a and 3b are views of examples of sensor signal lines with an iso-resistance compensation pattern according to the present invention.

FIG. 3a is an enlarged view of some region of the sensor signal lines 220 shown in FIG. 2.

Referring to FIG. 3a, the sensor signal lines 301 to 305 and the dummy signal lines 306 to 308 are configured with the same geometry and have a zigzag shape.

The sensor signal lines and the dummy signal lines are not limited to a specific shape and may have various shapes, as needed.

In one embodiment, the widths of the dummy signal lines 306 to 308 increase with increasing widths of the sensor signal lines.

Referring to FIG. 3a, the sensor signal lines 301 to 302 do not include a dummy signal line.

The sensor signal line 303 includes the dummy signal line 306, the sensor signal line 304 includes two sub-dummy signal lines 307 separated from each other, and the sensor signal line 305 includes four sub-dummy signal lines 308 separated from each other.

In FIG. 3a, the sensor signal line 305 placed at the rightmost side has a greater width than the other sensor signal lines 301 to 304 placed at the left. Accordingly, the dummy signal line 308 placed at the rightmost side also has a greater width than the dummy signal line 306 or 307 placed at the left.

In one embodiment, the widths and lengths of the dummy signal lines 306 to 308 are determined in consideration of the widths and lengths of the sensor signal lines in a fan-out area.

The fan-out area (FO) refers to a region in which each of the sensor signal lines disposed in an inactive area (IAA) of the touch panel 200 is connected to the touch drive IC 240 in the shortest length, and the sensor signal lines belonging to the same row in the fan-out area are multiplexed through a multiplexer so as to be connected to the same connection terminal of the touch drive IC 240.

In one embodiment, at least one sensor signal line (301 and 302) of the sensor signal lines 301 to 305 belonging to the same row may be free from a dummy signal line. In one embodiment, the sensor signal lines 301 to 305 have different shapes from the dummy signal lines 306 to 308.

In one embodiment, the widths and lengths of the dummy signal lines belonging to the same row vary depending on the location of the touch drive IC 240, and the widths of the sensor signal lines belonging to the same row do not vary depending on the location of the touch drive IC 240.

Figure 1A:
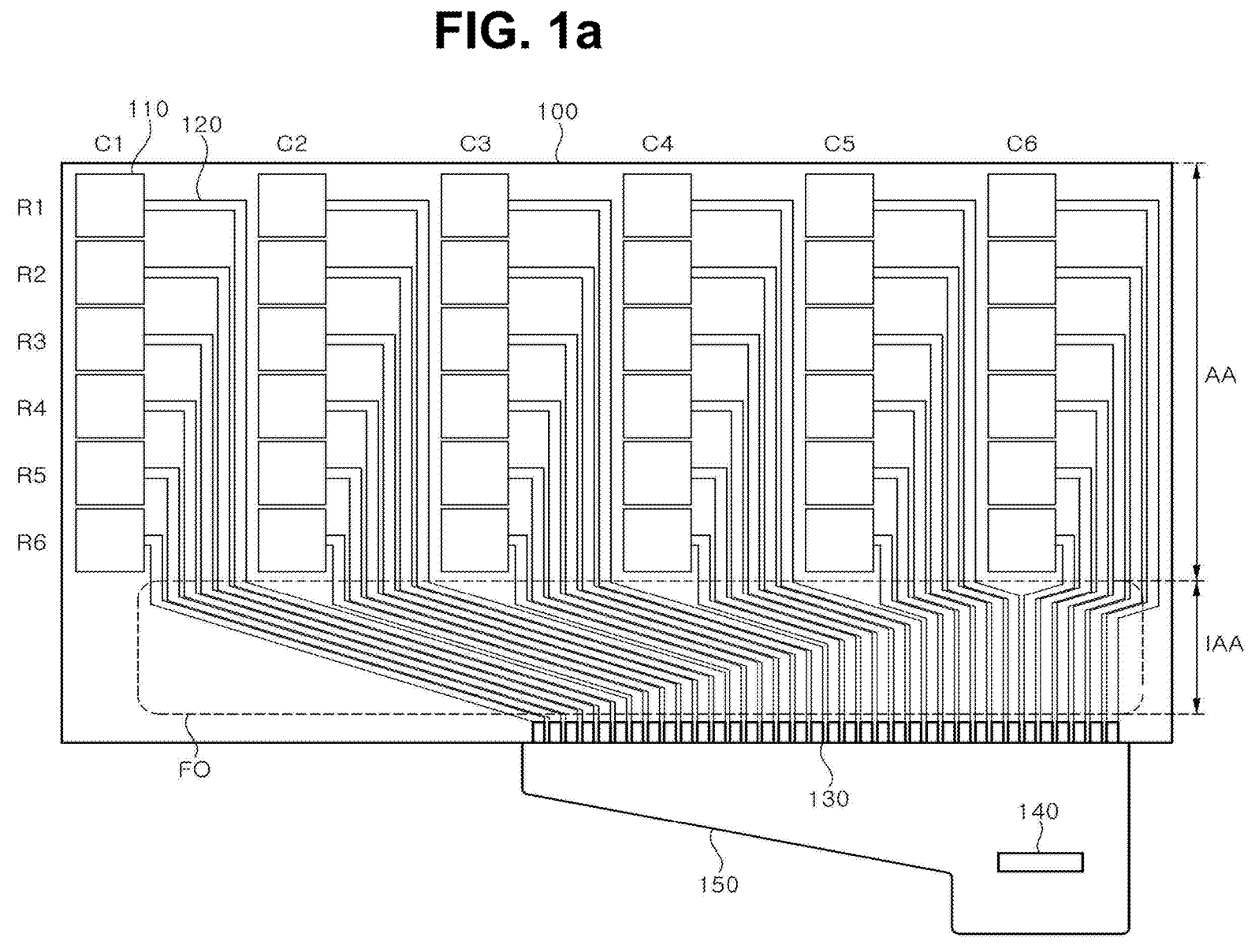
Figure 1B:
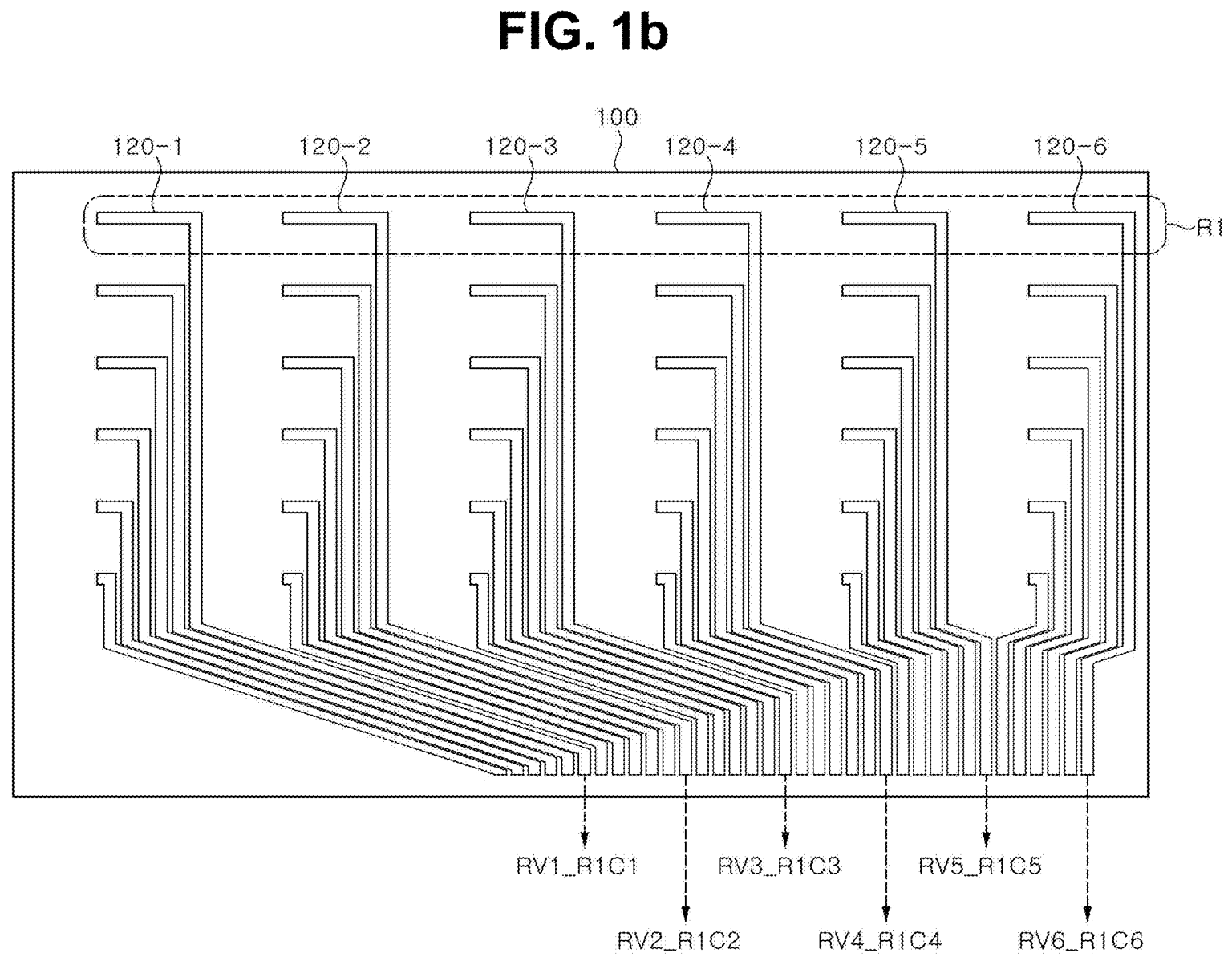
Figure 1C:
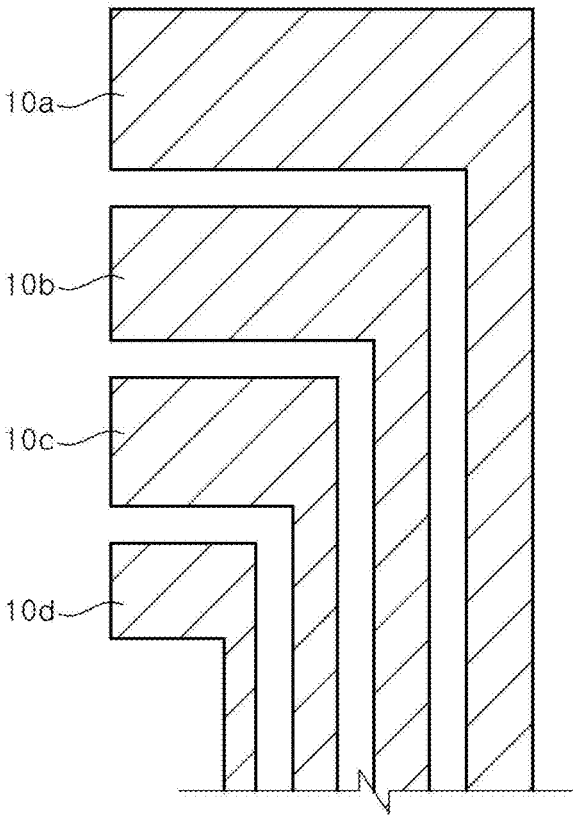
FIG. 1c is a diagram of another example of the conventional sensor signal line.

The conventional sensor signal lines shown in FIG. 1c require design change of the widths of the sensor signal lines upon change in location of the touch drive IC.

Despite the change of the touch drive IC 240, the sensor signal lines according to the present invention can keep resistance deviation between the sensor signal lines constant without design change of the widths of the sensor signal lines by separating and converting some sensor signal lines from each sensor signal line into dummy signal lines.

In one embodiment, the sensor signal lines 301 to 305 and the dummy signal lines 306 to 308 are formed of a transparent conductive material (for example, ITO).

In one embodiment, the dummy signal lines (307 and 308) include at least one sub-dummy signal line separated individually.

In one embodiment, the dummy signal line is constituted by one or more sub-dummy signal lines connected to each other.

In one embodiment, the sensor signal lines 301 to 305 have different shapes from the dummy signal lines 309 to 311.

Referring to FIG. 3b, the sensor signal lines 301 to 305 have a zigzag shape and the dummy signal lines 309 to 311 have a linear shape.

Although some embodiments have been described herein, it should be understood by a person having ordinary knowledge in the art that the present invention is not limited to the above embodiments and the accompanying drawings and that various modifications, variations and alterations can be made without departing from the spirit and scope of the invention.

The invention claimed is:

1. A touch panel having an iso-resistance compensation pattern, comprising:
   a plurality of touch electrodes arranged in a matrix of multiple rows and multiple columns;
   a plurality of sensor signal lines each connected to a corresponding one of the plurality of touch electrodes; and
   a touch drive integrated circuit (IC) configured to analyze a touch signal of each of the plurality of touch electrodes transmitted through a respective one of the plurality of sensor signal lines to determine whether each of the plurality of touch electrodes is touched,
   wherein at least one dummy signal line is constituted in at least corresponding one of the plurality of sensor signal lines to match resistance of the sensor signal lines belonging to the same row within an allowable tolerance,
   wherein a width of the dummy signal line increases with increasing a width of the corresponding sensor signal line,
   wherein the width and a length of the dummy signal line are determined in consideration of the width and a length of the corresponding sensor signal line in a fan-out area,
   wherein the fan-out area being a region in which each of the sensor signal lines disposed in an inactive area of the touch panel is connected to the touch drive IC in the shortest length, and
   wherein the sensor signal lines belonging to the same row in the fan-out area are multiplexed through a multiplexer so as to be connected to the same connection terminal of the touch drive IC.

2. The touch panel according to claim 1, wherein the dummy signal line is formed by disconnecting a portion of the corresponding sensor signal line so as not to transmit the touch signal.

3. The touch panel according to claim 1, wherein at least one of the sensor signal lines belonging to the same row is free from a dummy signal line.

4. The touch panel according to claim 3, wherein the sensor signal line has a different shape from the dummy signal line.

5. The touch panel according to claim 1, wherein the at least one dummy signal line is a plurality of dummy signal lines, widths and lengths of some of the dummy signal lines belonging to the same row vary depending on a location of the touch drive IC, and widths of some of the sensor signal lines belonging to the same row do not vary depending on the location of the touch drive IC.

6. The touch panel according to claim 1, wherein the sensor signal line and the dummy signal line are formed of a transparent conductive material.

7. The touch panel according to claim 1, wherein the dummy signal line comprises at least one sub-dummy signal line separated individually.

* * * * *